United States Patent [19] … [11] 3,955,246
Tanaka … [45] May 11, 1976

[54] SEPARABLE FASTENER
[75] Inventor: Akio Tanaka, Yokohama, Japan
[73] Assignee: International Fastener Establishment, Vaduz, Liechtenstein
[22] Filed: Apr. 22, 1975
[21] Appl. No.: 570,556

Related U.S. Application Data

[60] Division of Ser. No. 347,683, April 4, 1973, which is a continuation-in-part of Ser. No. 230,254, Feb. 29, 1972, abandoned, and Ser. No. 233,910, March 13, 1972, abandoned, which is a continuation of Ser. No. 56,436, July 20, 1970, abandoned.

[30] Foreign Application Priority Data

| July 23, 1969 | Japan | 44-57904 |
| Mar. 1, 1971 | Japan | 46-10264 |
| Mar. 22, 1971 | Japan | 46-16080 |
| Feb. 4, 1972 | Japan | 47-12756 |

[52] U.S. Cl. ............ 24/204; 24/205.13 D; 24/16 PB
[51] Int. Cl.² .......................................... A44G 17/00
[58] Field of Search ............. 24/204, 205.13 D

[56] References Cited
UNITED STATES PATENTS
2,733,177  1/1956  Meyer ................. 161/111
3,533,871  10/1970  Zentmyer ............. 24/204

FOREIGN PATENTS OR APPLICATIONS
1,037,455  9/1953  France ............... 24/205.13 D

Primary Examiner—Bernard A. Gelak
Attorney, Agent, or Firm—Ryder, McAulay, Fields, Fisher & Goldstein

[57] ABSTRACT

A separable fastener is disclosed which has the form of a tape having a plurality of laterally adjacent uniformly corrugated strips. Adjoining strips are staggered relative to one another so that the ridges of one strip are laterally aligned with the depressions or spaces between the ridges of adjoining strips, with the adjoining strips being joined together at their crossover points. A second tape of identical construction can be joined to the first tape by merely pressing the two tapes together in a face-to-face relationship. There is also disclosed apparatus and a method for manufacturing the separable fastener which includes means for passing a strip of thermoplastic material through mutually engaging rolling dies which create the corrugations.

11 Claims, 36 Drawing Figures

SEPARABLE FASTENER

This is a division of application Ser. No. 347,683, filed Apr. 4, 1973, which is a Continuation-in-Part of U.S. Pat. application Ser. No. 230,254 filed 2/29/72, now abandoned and of U.S. Pat. application Ser. No. 233,910 filed 3/13/72 which itself is a continuation of U.S. Pat. application Ser. No. 56,436 filed 7/20/70, both abandoned.

BACKGROUND

This invention relates to separable fasteners and a method and apparatus for manufacturing these fasteners. More particularly, the fasteners are of the press-on and split-off type in which at least one face is provided with a series of laterally adjacent uniformly corrugated resilient strips. Adjoining strips are staggered relative to each other so that the ridges on one strip are laterally aligned with the depressions or spaces between ridges or adjoining strips.

Press-on and split-off separable fasteners are the type in which two members, each having a large number of closely spaced fastening elements, engage one another in a face-to-face relationship in contrast with zippers wherein the two members employ a side-to-side butt relationship. A well known type of press-on and split-off fastener employs a first tape having a large and dense population of flexible hooks mounted on a face thereof and a second tape having a large and dense population of loops mounted on a face thereof. The two tapes fasten together when they are pressed face-to-face so that the hooks engage the loops and they become separated or split apart when the tapes are pulled away from each other in a direction perpendicular to the plane of the engaging faces. In making this type of fastener, both the first and second tapes have a pile face construction which forms loops. In order to form hooks on one of the tapes it is necessary to cut the piles into hooks thereby requiring a relatively expensive manufacturing process. This type of fastener also requires a mating pair of hooked and looped tapes since if two hooked tapes are pressed face-to-face or if two looped tapes are pressed face-to-face a weak closure is formed. This precludes being able to fold the tape upon itself to form an effective closure. It also requires care and uniformity of selection when deciding which of the first and second tapes is to be applied to particular items to insure that two items which are to be attached together do not both wind up with either a hooked tape or a looped tape. For example, such care in selection must be used when one item is to serve as a base on which any one or more items are to be fastened.

Accordingly, it is one objective of this invention to provide a novel press-on and split-off type fastener which can be manufactured easily and inexpensively and which permits the use of mating tapes of identical structure to provide a strong and effective fastener.

It is another objective of this invention to provide a method of and apparatus for manufacturing the separable fastener of this invention inexpensively and continuously.

BRIEF DESCRIPTION OF THE INVENTION

Briefly described, this invention, in one form, comprises a tape having a plurality of laterally adjacent uniformly corrugated strips, each strip forming substantially a sinusoidal curve about the central plane of the tape. Adjoining strips are staggered relative to one another so that the ridges (peaks) of one strip are laterally aligned with the depressions or spaces between the ridges of adjoining strips. Adjoining strips are joined together at their cross-over points of the sinusoidal curve, or, in other words, along a plane through the center of the strips, which plane forms the central plane of the tape. The upper surface and lower surface of the tape have the same configuration; however, there is a 180° phase shift between the ridges and depressions both longitudinally along the length of the tape and transversely across the width of the tape. The phase shift is caused by the fact that a ridge on the upper surface forms the depression on the lower surface and a depression on the upper surface forms a ridge on the lower surface.

A second tape of identical construction can be joined to the first tape by merely pressing the two tapes together in a face-to-face relationship. When one tape is pressed upon the other the ridges of the one tape mate with the depressions of the other tape and form a friction interlock providing a strong and effective fastener. In order to strengthen the closure, friction enhancing projections can be added along the sides of the ridges.

Another form of this invention provides a fastener wherein each of the strips is formed with a series of ridges projecting from only one side of the tape and spaced apart along the length of the tape. Adjacent strips are joined in staggered or alternating relationship providing a transverse and longitudinal matrix or alternating ridges and depressions or spaces between ridges.

The fastener of this invention can be manufactured by extruding or calendering a strip of thermoplastic material and passing the strip through mutually engaging rolling dies which create the corrugations and the friction enhancing projections, if employed. The corrugated strip may then be wound into rolls for storage purposes.

BRIEF DESCRIPTION OF THE DRAWINGS

The invention, objectives and attendant advantages of this invention will be better understood from the detailed description below taken together with the drawings in which.

DETAILED DESCRIPTION OF THE FIRST EMBODIMENT

Turning now to FIGS. 1 through 4 there is illustrated a fastener 10 formed in accordance with the first embodiment of this invention. The fastener 10 comprises two facing interengageable members 12, 14 each includes a series of laterally adjacent strips only four of which are shown at 16, 17, 18 and 19. Each strip is of equal width continuously and uniformly corrugated into the shape of a sinusoidal curve providing alternating ridges 20 and depressions or grooves 22. The strips 16–19 are laterally aligned in alternating or staggered relationship to one another so that the ridges 20 of one strip, for example strip 18, are laterally aligned with the depressions 22 of the laterally adjacent strips 17 and 19. Similarly, the depressions 22 of strip 20 are laterally aligned with the ridges 20 of adjacent strips 17, 19.

Figure 1:
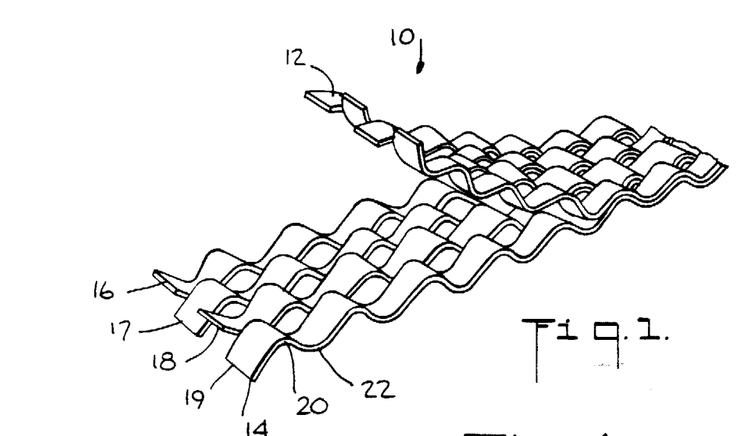
FIG. 1 is a perspective view of a separable fastener formed in accordance with a first embodiment of this invention.
Figures 2, 3:
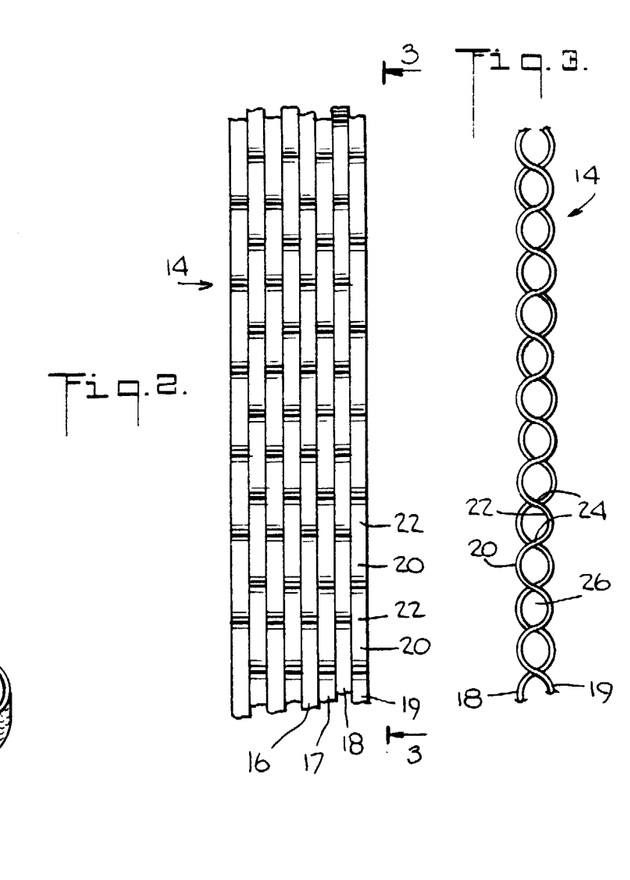
FIG. 2 is a plan view of one member of the separable fastener of FIG. 1.
FIG. 3 is a side view of the fastener member of FIG. 2 taken along line 3—3.

The corrugated strips 16–19 are so related with respect to one another that adjacent strips cross one another in a series of Xs as can be seen in FIGS. 1 and 3. Adjacent strips are joined together at such cross points 24 and these cross points define the central plane of each member 12, 14 of the fastener 10, which plane is the middle of the height of the fastener member. As cana be seen particularly with reference to FIGS. 1 and 3 the fastener members 12, 14 are in the form of an orderly arrangement or matrix of laterally and transversly alternating ridges and depressions with the points of juncture of adjacent strips forming straight lines between adjacent strips in a longitudinal direction and straight lines between adjacent ridges 20 and depressions 22 in a transverse direction. Because the juncture points 24 of adjacent strips form straight lines both longitudinally and transversely the fastener 10 can be bent along the lines defined by these juncture points without substantially or harmfully deforming the ridges and grooves thereby forming a flexible fastener.

With reference to FIG. 3, it will also be appreciated that the fastener, when looked at from the side, i.e., along the plane of a fastener member 14, forms a series of openings 26. Each of the openings 26 has a circular shape when the ridges 20 and depressions 22 have semi-circular form. If the ridges 20 and depressions 22 are hyperbolic in shape, the spaces 26 will be elliptical. The shapes of the openings are of no consequence and different shaped corrugations produce openings of different shapes. What is important is the existence of the openings.

Figure 4:
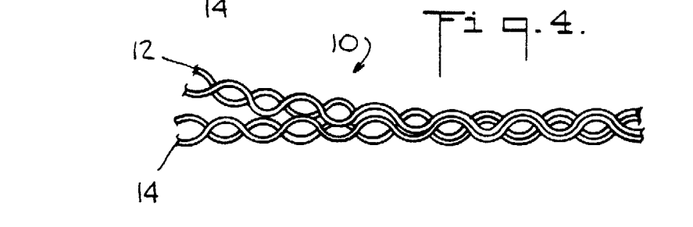
FIG. 4 is a side view of two mating strips of the separable fastener of FIG. 1.

A complete fastener 10 is formed of two members 12, 14 of identical shape, which shape is as described above. Each member 12, 14, and each of their strips 16–19 are flexible and resilient. It has been found that plastic material such as nylon, polyvinyl chloride, polypropylene, polyethylene and other similar materials are particularly suitable. Paperboard or other suitable sheet material also can be used. When two such members are pressed together in a face-to-face relationship, such as is illustrated in FIGS. 1 and 4, the ridges 20 of one member 12 are formed into the depressions 22 of the other member 14. The side edges of the strips 16–19 of one member frictionally engage the side edges of the ridges 16–19 of the other member to provide a firm closure.

In order to separate the members 12, 14 once joined together the members are split apart by pulling them in opposite directions perpendicular to the plane of each of these members.

Figure 5:
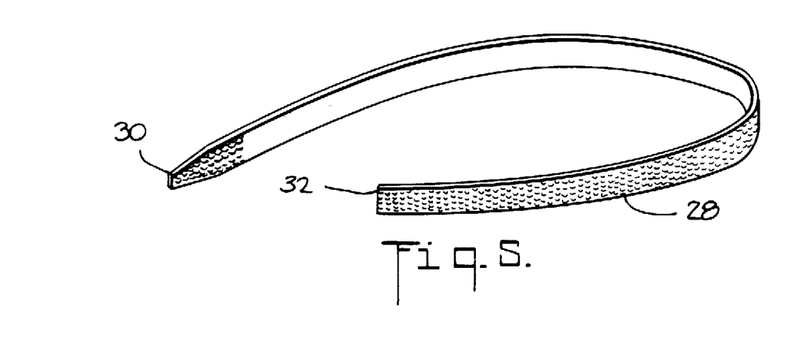
FIG. 5 is a schematic illustration of a belt or other circular member formed from the separable fastener of FIG. 1.

Because each of the members is formed with ridges and depressions on both sides thereof it is possible to join additional members to the two members already joined together thereby providing the ability to join together as many layers as desired. It is also possible to fold and join a single member upon itself or form a loop out of a single member 28 and join the ends 30, 32 together front-to-back (see FIG. 5).

Because of the uniformity of structure along the length and width of each of the members, there is no single position or limited number of positions of alignment between two such members required in order to form the desired closure. This enables the position of the closed state to be varied in fine degrees both along the length of the members and along the width of the members by merely allowing the ridges of one of the members to shift either laterally or transversely one or more grooves of its mating member as desired. An example of how fine the adjustment can be may be seen from an example of a fastener which has proved satisfactory. A fastener was made wherein each strip 16–19 measured 1 mm. in width, 2.5 mm. in height (from the top of a ridge 20 to the base of a depression 22), 5 mm. between adjacent ridges and between adjacent grooves, and 0.5 mm. in thickness. Therefore a longitudinal shift of members one ridge is equal to a 5 mm. shift and a transverse shift of one strip is equal to a 1 mm. shift. When many strips are formed side-by-side many ridges and depressions are provided and are densely populated on the fastener member so that when two such fastener members are joined the frictional engagement force between ridges and strips occurs many times in a relatively small area thereby providing an effective closure.

When two fastener members 12, 14 are in a closed state, that is when they have been pressed together face-to-face, if one tries to pull the members apart in a direction parallel to the width of the fastener members, no relative sliding motion will be obtained because the ridges 20 of one member abut the strips of the other member, and, since each member with the exception of the extreme end strips is supported on both sides by the strips of the mating fastener member, very little deformation will take place and the fastener will hold together. If a force is applied tending to cause one member 12 to slide longitudinally with respect to the other fastener member 14 the two fastener members will be held together by the frictional force as well as by the abutment of the front edge of the ridges of the mating fastener member. Consequently, separation of the fastener members can only be accomplished by applying a split-apart or peeling force in a direction perpendicular to the plane of the fastener member, which force will have to be sufficient to overcome the frictional force caused by the interference of the mating fastener members.

Figures 6, 7, 8:
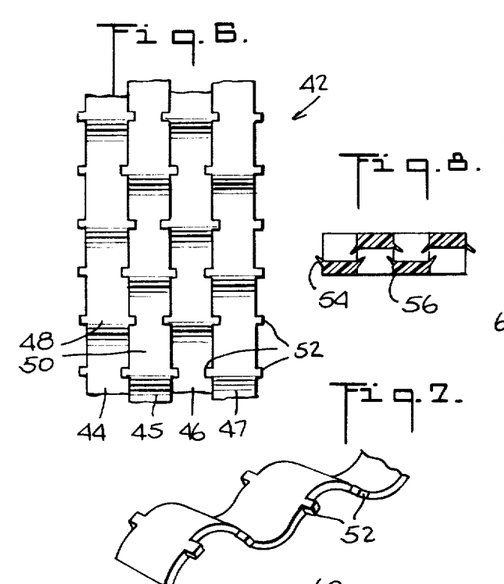
FIG. 6 is a plan view of a modified form of the first embodiment, the modified form including projections for increasing the fastener strength.
FIG. 7 is a perspective view of a portion of one strip of a separable fastener member formed in accordance with a second modified form of the first embodiment, the second form including projections for increasing the fastener strength.
FIG. 8 is an end sectional view of a third modification form of the first embodiment wherein the projections are formed with a hooked shape.

SECOND EMBODIMENT OF THIS INVENTION

Where the application of the fastener of this invention requires a greater split-apart force to separate the members than is provided by the fastener 10 described above, such a fastener can be obtained with a minor modification of the fastener 10. Turning now to FIG. 6 there is illustrated one member 40 of a fastener 42 having the same general shape as fastener 10 described above namely, a series of laterally adjacent strips 44, 45, 46 and 47. Each strip is of equal width and is continuously and uniformly corrugated in a sinusoidal shape. Adjacent strips are staggered or alternated so that the ridges 48 of one strip 46, for example, are laterally aligned with the depressions 50 of the adjacent strips 45, 47. To enhance the frictional interference between members of the fastener 42 a projection 52 is provided on one or both sides of at least some of and preferably all of the strips 44–47. While the projections 48 can be located at any height above or below the plane of the fastener member 40 it is preferred that the projections be placed at or near the apex of the ridges 48. The projections 52 extend in a transverse direction therefore reducing the clearance between laterally aligned ridges or alternate strips, for example between the ridges 48 of strips 44 and 46 and between the ridges of strips 45 and 47. In order to make each fastener member 40 symetrical about the plane of the member so that the top and bottom halves of the member are equally effective, the projections 52 also can be located at or near the bottom of the depressions 50.

Instead of forming the projections 52 at the apex of the ridges, they may be formed at one or both sides of the apex and spaced downwardly therefrom (see FIG. 7). The greater the number of projections, the greater will be the joining force of the fastener 42. The shape of the projections may take various forms. For example, the projections may be in the shape of a grain or nub as shown in FIGS. 6 and 7 or they may be in the shape of a horn 54 as shown on the fastener member 56 in FIG. 8. When using the horn shape projection 54, as two fastener members are joined together, the horns 54 are pressed inwardly toward their respective strip until the mating ridge passes by at which point the horns snap back or return to their original position by virtue of their elasticity and provide an extremely effective closure.

When two fastener members having the form of this second embodiment are pressed together in face-to-face relationship the projections on the strips of one of the members abut and are then forced between the projections extending from the strips of the other member. Because the fastener members are formed of a resilient material the projections are not broken and the strips become partially deformed during the joining process until the projections of one member pass by the projections of the other member. At that point the projections of each member reside within the open spaces (see spaces 26 of FIG. 3) of the opposite member. In order to split the fastener members apart it is necessary to reverse this process. With the horn shaped projections 54 (FIG. 8) the force required to open the fastener is substantial because the horns will be forced to move in a direction opposite to their inclination. In addition to the holding force of the projections the two fasteners are held together by the friction force provided by the interference of the side edges of mating strips.

In the same fashion as described above with respect to the first embodiment it is possible to join together two, three or more layers of fastener members, especially if the ridges 48 and depressions 50 or, in other words, both faces of each member contain the friction enhancing projections 52. It is also clear that the fastener member 12 of the first embodiment can be joined to the fastener member 40 of the second embodiment and that the joining force for such members will be greater than the joining force between two fastener members 10 of the first embodiment but less than the joining force between two fastener members 40 of the second embodiment.

THIRD EMBODIMENT OF THIS INVENTION

In the first two embodiments described above each strip of the fasteners was formed in the shape of a sinusoidal curve providing a synthetic configuration about the plane of the fastener. This permitted either face of the fastener to be used in forming a closure and also permitted the sandwiching of three or more such fasteners.

Figure 9:
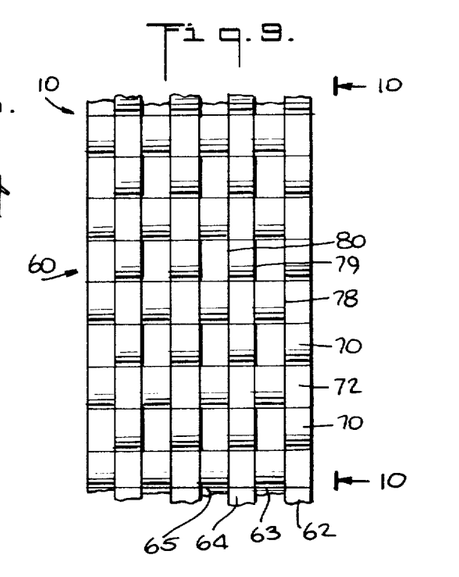
FIG. 9 is a plan view of a separable fastener formed in accordance with a second embodiment of this invention.
Figure 10:
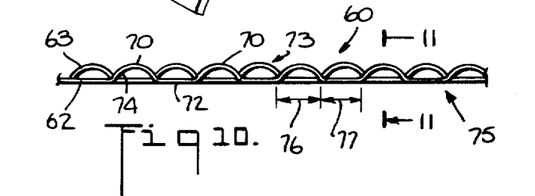
FIG. 10 is a side view taken along the line 10—10 of FIG. 9.
Figure 11:
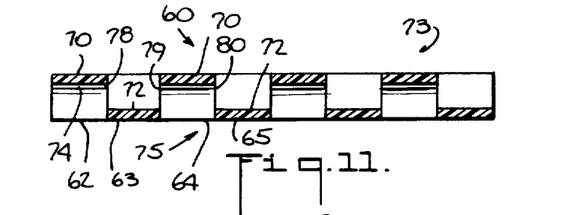
FIG. 11 is a sectional view taken along the line 11—11 of FIG. 10.

In FIGS. 9–11 there is illustrated a third embodiment of this invention wherein a fastener member 60 is formed of a plurality of laterally adjacent corrugated strips 62, 63, 64, 65 each of which is formed with a series of equally sized ridges 70 and spaces 72 between the ridges 70. Only one face 73 of the member 60 has ridges 70, the ridges forming depressions 74 on the opposite face 75. This form of fastener member 60 can be considered a one-sided wave form. Adjacent strips 62–65 are placed in a staggered relationship so that the ridges 70 of one strip, strip 64, for example, are laterally aligned with the depressions or spaces 72 of the laterally adjacent strips 63, 65.

Figure 12:
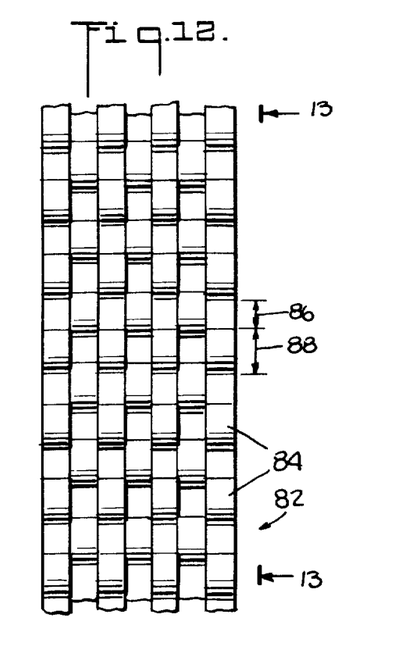
FIG. 12 is a plan view of a modified form of the second embodiment.
Figures 13, 14, 16, 18:
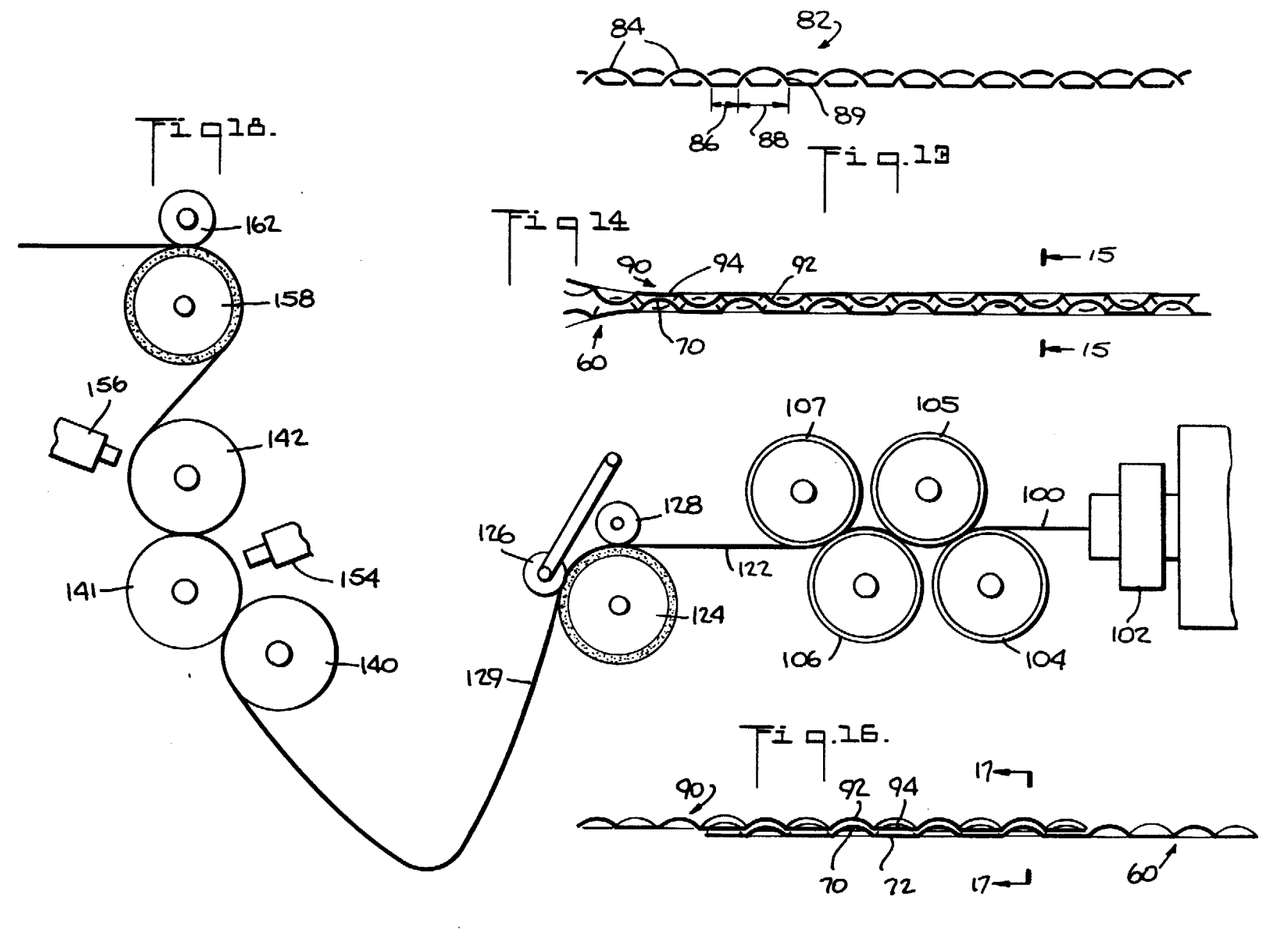
FIG. 13 is a side view taken along line 13—13 of FIG. 12.
FIG. 14 is a side view of two fastener members of the type illustrated in FIG. 10 joined together in a face-to-face relationship.
FIG. 16 is a side view of two fastener members of the type illustrated in FIG. 10 joined together in a face-to-back relationship.
FIG. 18 is a schematic flow diagram of apparatus and a process for making separable fasteners formed in accordance with this invention.

The length of the spacing 72 between the ridges 70, denominated by dimension line 76 (FIG. 10) is equal to the distance between the lower ends of the ridges, denominated by dimension line 77. In that case the adjacent strips are joined together along straight transverse lines 78, 79, 80 defined by the lower end of the ridges 70 since these are the points where the adjacent strips cross one another. In a second form 82 of this embodiment, as shown in FIGS. 12 and 13, the ridges 84 are spaced apart a distance 86 less than the distance 88 between the lower ends of the ridges 84. In the fastener member 82 illustrated the spacing between the ridges 84 is approximately one-half the distance between the lower ends of the ridges 84. With such a configuration the adjacent strips cross one another and are joined together at a point 89 approximately midway up the height of the strip. In either case this third embodiment provides a one-sided wave fastener wherein one face of the fastener member has a series of spaced apart ridges extending from the base of the members and the other face of the fastener member has a series of depressions with the ridges or depressions, depending upon which side of the fastener one is viewing, alternating with the flat spaces between the ridges or depressions both in a longitudinal and lateral direction to form a matrix as shown in FIGS. 9 and 12.

Figure 15:
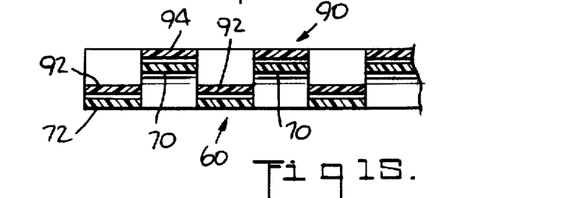
FIG. 15 is a sectional view taken along the line 15—15 of FIG. 14.
Figure 17:
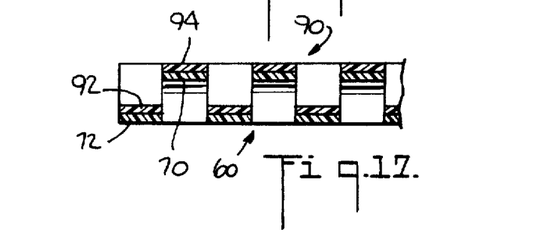
FIG. 17 is a sectional view taken along the line 17—17 of FIG. 16.

When two fastener members 60, 90 of the same construction are placed face-to-face as may be seen in FIGS. 14 and 15, the ridges 70 of one fastener member 60 reside between the ridges 92 of the adjacent strips of the other fastener member 90. In this fashion the side edges of the strips of one fastener member frictionally engage the side edges of the strips of the other fastener member and hold the fastener members together forming an effective closure. Fastener members 60, 90 of this type can also be joined by placing the front face of one member 60 against the back face of the other member 90 as is illustrated in FIGS. 16 and 17. In this fashion the ridges 70 of the one member 60 reside within the depressions formed on the reverse face of the ridges of the other member 90 and are held in position by frictional engagement with the side edges of the adjacent strips of the member with which it is mating.

If the spacing between adjacent ridges of each strip is less than the distance between the lower ends of the ridges, such as is illustrated in FIGS. 12 and 13 a complete nesting and mating of the fastener members will not take place. However, a closure will be accomplished since the side edges of each fastener member will frictionally engage the side edges of the other fastener member for a distance along the height of the ridges from the ridge apex to the point 89 where adjacent strips of each fastener member are joined together. This provides a weaker closure force which, for certain applications, is preferred over the stronger closure force obtained by the first form 60 of this third embodiment shown in FIGS. 9–11. If it is desired to increase the closure force the fastener members 60 and 82 of this third embodiment can be modified in the same manner as described above in the second embodiment (see FIGS. 6–8). Projections in the form of nubs or horns can be provided at or adjacent to the apex of the ridges which projections extend slightly beyond the sides of the strips. The interengagement of the projections of one fastener member with the projections and side edges of the other fastener member provide an extremely effective and strong closure force. A fastener member having projections can be joined to a fastener member without projections thereby providing a closure force of less magnitude than if both fastener members had projections.

One advantage of the one-sided wave form of this invention over the two-sided or sinusoidal wave described in the first and second embodiments is that the fastener members are provided with a flat surface which permits ready attachment of the fastener to another member, such as a piece of cloth.

FOURTH EMBODIMENT OF THIS INVENTION

Figures 34, 35, 36:
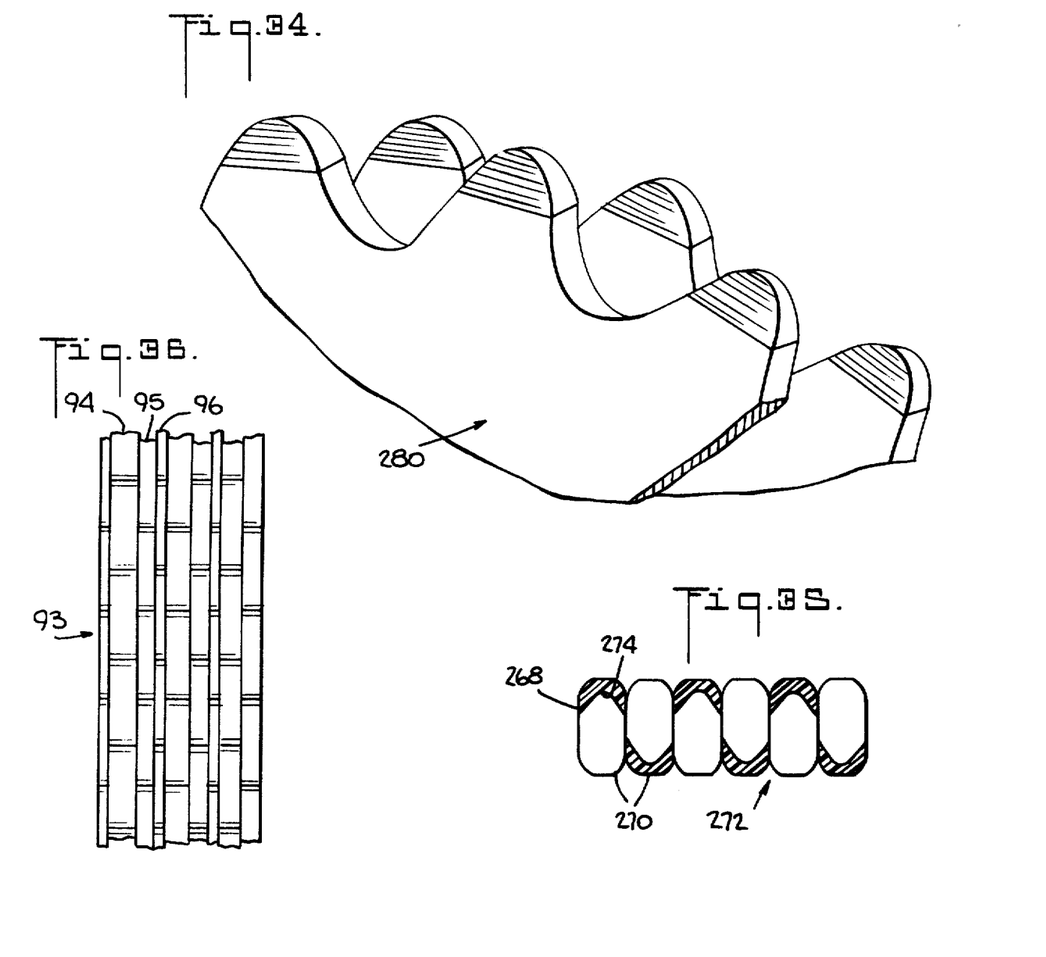
FIG. 34 is a perspective view of a portion of a modified rolling die used in the apparatus of FIG. 18.
FIG. 35 is a sectional elevational view of a fastener member formed from the roller dies of FIGS. 33 and 34 used in sequence.
FIG. 36 is a plan view of a separable fastener formed in accordance with a fourth embodiment of this invention.

In the embodiment described above and illustrated in FIGS. 1–17 the individual strips (for example, strips 16–17 in FIG. 1) of which each fastener member is comprised are shown to be of equal width and are uniform in all respects. As can be seen in FIG. 36, it is possible to form a fastener member 93 having strips 94, 95 and 96 of different widths.

While such a fastener member 93 cannot be joined with a similar fastener member at all positions as can be done with the first three embodiments, the fastener members can be joined together with the strips of equal size are properly aligned. This embodiment is particularly suitable when it is desired to have a particular alignment of the mating fastener members 93 and the items to which the fastener members are attached.

METHOD AND APPARATUS FOR MANUFACTURING SEPARABLE FASTENER

Apparatus designed to manufacture the separable fasteners discussed above is now described with reference to FIGS. 18–20. A plastic or resin sheet 100 which is soft or capable of being shaped and set is passed from a supply, such as from an extruder 102, between a series of closely adjacent rolling dies 104, 105, 106, 107. As mentioned above, the sheet may be made of a thermoplastic or thermosetting synthetic resin. The sheet may be supplied in the form of a roll of long tape or of a wide roll of long film.

Figure 19:
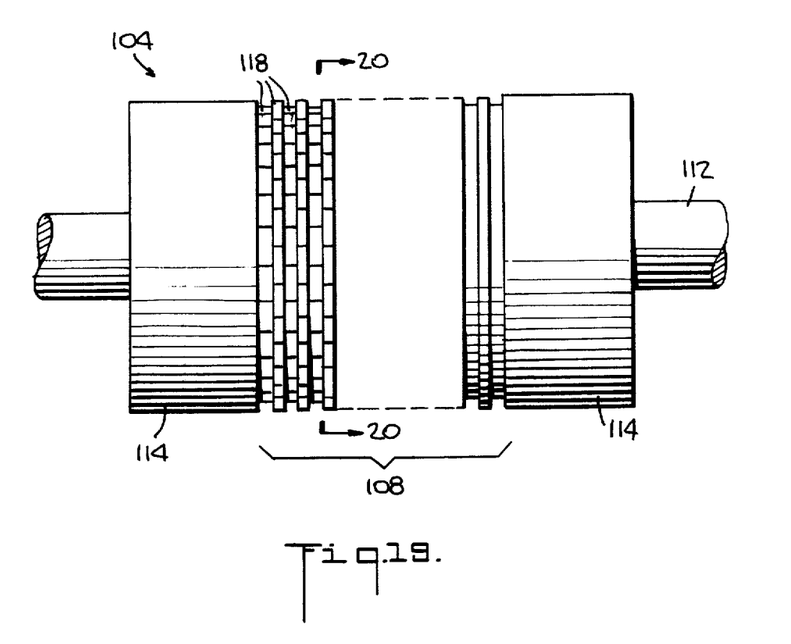
FIG. 19 is a front view of a corrugated strip forming rolling die used in the apparatus of FIG. 18.
Figure 20:
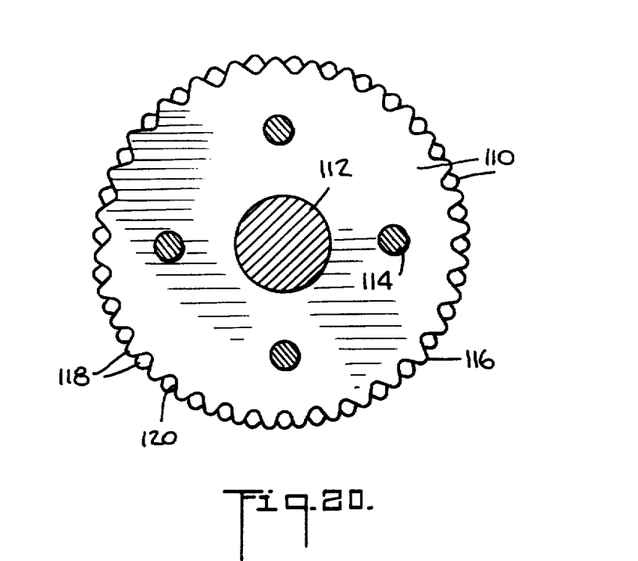
FIG. 20 is a sectional view of a rolling die taken along line 20—20 of FIG. 19.

Each rolling die 104–107 is of the type that provides forced rotation thereby advancing the sheet 100 being passed between the dies. Each rolling die comprises a fastener forming section 108 having a plurality of contiguous disks 110 axially aligned and supported on a shaft 112. A restraining disk or roller 114 is mounted on each end of the shaft 112 and contiguous with the outermost disk of the fastener forming section 108. Through the use of pins 114, keys or other conventional means the disks 110 are prevented from rotating relative to one another, or, in other words, all disks rotate as a single unit.

Each disk 110 forms one strip of a fastener member (for example strips 16–19 of fastener member 14 of FIG. 1) and, therefore, is the same width as each fastener strip. Furthermore, each disk has a corrugated or undulating periphery 116 comprised of teeth 118 and troughs 120 in order to form the corrugated shape of each strip. Adjacent disks are offset relative to one another so that the teeth 118 on one disk 110 are axially aligned with the troughs 120 of the disk contiguous thereto. This provides the laterally alternating or staggered relationship between adjacent strips on the fastener.

The rolling dies 104–107 could also be formed by cutting corrugations in the surface of a cylindrical roller in place of joining together a series of individual disks. However, by using disks it is possible to vary the width or the fastener forming section and, therefore, the number of strips formed, by merely changing the number of disks used at a particular time.

Each rolling die is mated with another rolling die of the same construction so that the teeth 118 of one rolling die are received by the troughs 120 of the mating rolling die. For example, rolling die 104 mates with rolling die 105 and rolling die 106 mates with rolling dies 105 and 108. When the soft sheet 100 emerging from the extruder 102 is passed between the mating rolling dies 104–107 the fastener forming section 108 of the mating rolling dies forms laterally adjacent corrugated strips conforming to the shape of the dies' periphery 116. After the sheet has passed through a series of pairs of mating rolling dies, the sheet, now in the form of corrugated strips, has gradually cooled and taken on a stabilized corrugated form 122. The corrugated sheet 122 is then fed between driving rollers 124, 126, 128 for pulling the sheet 122 through the rolling dies 104–107 and passing it on. In this manner production of the corrugated strips 129 for forming fastener members of the type illustrated in FIG. 1 is complete and may then be wound upon a take-up reel (not shown) for storage and shipping.

Figure 21:
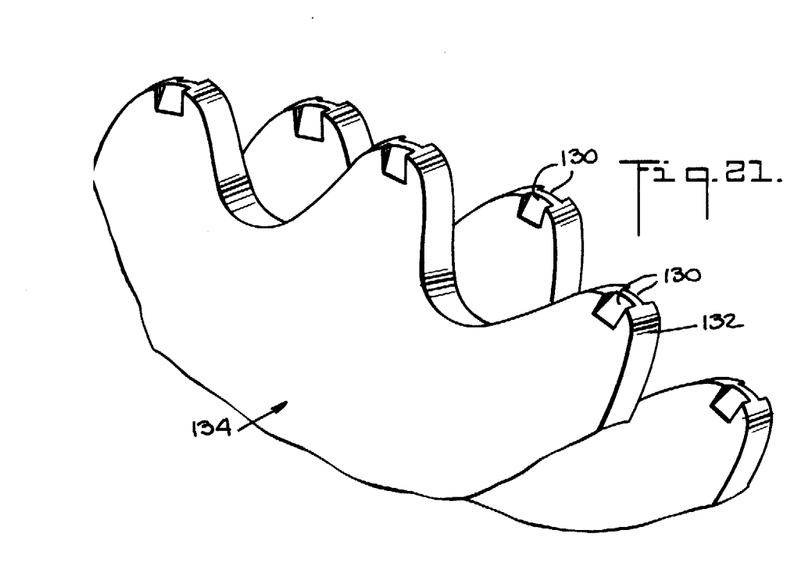
FIG. 21 is a perspective view of a portion of a rolling die designed to form projections on the sides of corrugated strips.
Figures 22, 23:
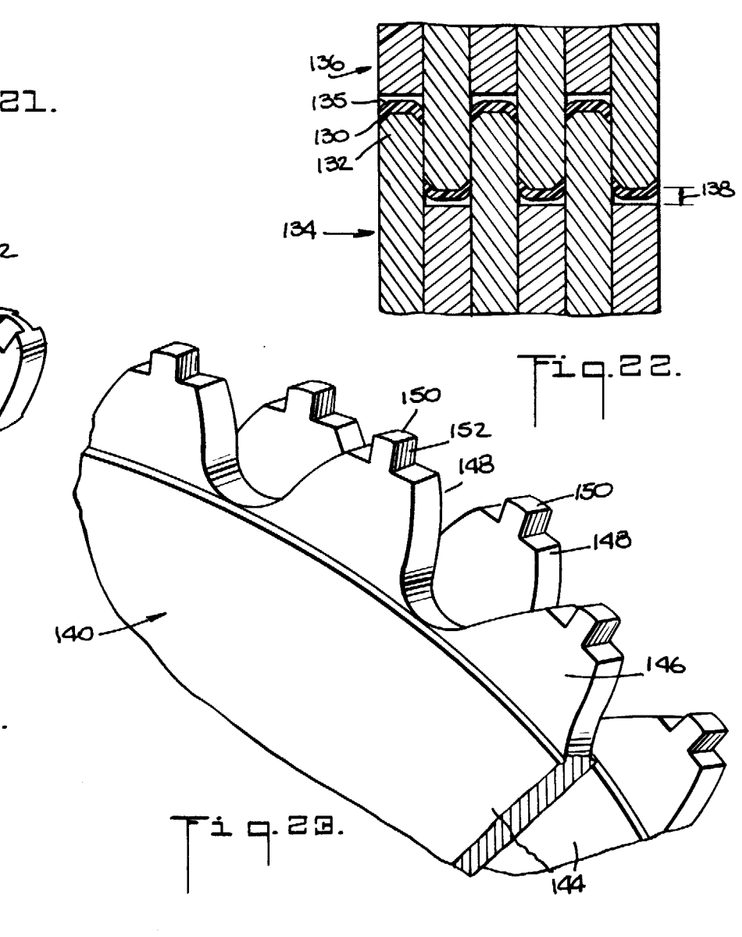
FIG. 22 is a sectional view of mating rolling dies of the type shown in FIG. 21 shown forming corrugated strips.
FIG. 23 is a perspective view of a portion of a roller used in the apparatus of FIG. 18.

In order to manufacture the type of fastener which has projections 52, 54 for increased locking force, this type being shown in FIGS. 6–8, the rolling dies 104–107 are modified as illustrated in FIGS. 21 and 22. As can be seen, small notches or cuts 130 are formed on at least one side of the teeth 132 of the dies 134. If it is desired to have the projections on both sides of the fastener member strips then the notches 130 are formed on both sides of the dies' teeth 132 as is illustrated. When a soft sheet of material 135 is passed between a pair of mating rolling dies 134, 136 (FIG. 22), the material 135 is extruded into the notches 130 thereby forming the projections. It has been found that if the corrugated strips are formed with an arched periphery the insertion of the ridges of one of the fastener members into the depressions of a mating fastener member at the time of closure of the fastener is facilitated. The arched periphery can be formed by increasing the clearance 138 between the mating rolling die 134, 136.

When the rolling dies 134, 136 are utilized as a replacement for the dies 104–107 in the apparatus illustrated in FIG. 18, the corrugated strips 129 leaving the driving roller 124, 126, 128 have projections extending outwardly from the sides of the strips. In order to provide the horn shaped projections 54 (see FIG. 8) and to insure that the projections protrude downwardly and outwardly from the sides of the corrugated strips on which they are formed, these strips, after being discharged by the driving rollers pass through a group of rollers 140, 141 and 142. The rollers 140–142 are formed of a multiplicity of axially aligned disks 144 two of which are shown in FIG. 23. Each disk 144 has an undulating periphery portion 146 in the shape of teeth 148 of a slightly narrower width than that of the remainder of the disk 144. Each of the teeth 148 is provided a central radial extension 150. The extension 150 may be formed by cutting recesses 152 in the teeth.

Figure 24:
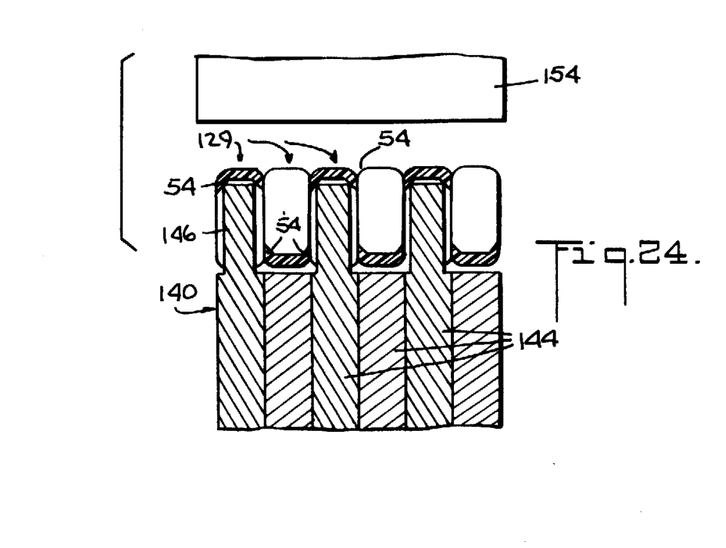
FIG. 24 is a sectional view illustrating the operation of a vibrator together with the roller of FIG. 23 to form the projections on a corrugated strip.

As the corrugated strips 129 pass between the mating rollers 140–142, the teeth 148 support the basal edges of the projections 54 extending from the side edges of the corrugated strips. A vibrator 154 is caused to beat lightly on the outer surface of the strips 129 (see FIG. 24) causing the projections 54 to be deformed and extend outwardly and downwardly providing the desired shape for strengthening of the interengagement of fastener members at the time of closure. Those projections 54 which are positioned within the depressions of the rollers 140–142 when the vibrator 154 contacts the strips 129 are located on the teeth of the adjacent roller and are contacted by an adjacent vibrator 156 which deforms the projections and insures their outwardly and downwardly extension.

The fastener strips 129 then are passed between a set of driving rollers 158, 162 from which they are fed to a take-up roller or fastener cutting device or some other location (not shown).

Figures 25, 26:
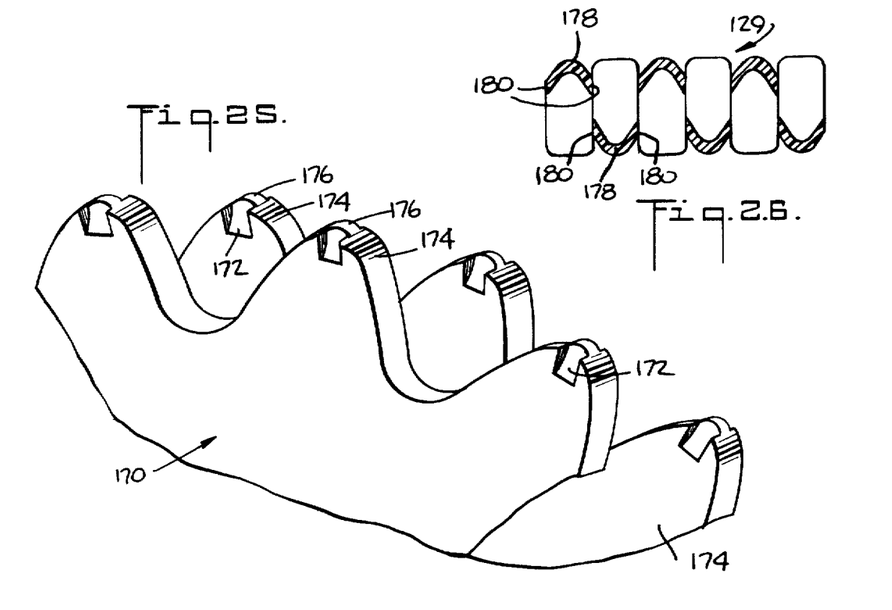
FIG. 25 is a perspective view of a portion of a modified rolling die used in the apparatus of FIG. 18.
FIG. 26 is a sectional elevational view of a fastener member formed from the rolling die of FIG. 25.

Another modification of the apparatus of this invention is illustrated in FIG. 25. In this embodiment rolling dies 170 are provided with notches 172 in the teeth 174 to produce projections as described above. However, the sections 176 of the teeth 174 between the notches 172 are arched radially outwardly. As the sheet material 100 passes between a pair of mating rolling dies 170 of this configuration the arched sections 176 produce narrow indentations 177 on the inner side of the ridges 178 formed in the fastener strips as well as forming projections 180 due to the material extruded into the notches 172 (FIG. 26). The corrugated strips are then passed between a roller 140 having the same configuration described above and a vibrator 154 wherein the indentations 177 are brought into contact with the radial extensions 150 of the roller. As the vibrator beats upon the corrugated strips the projections formed in the notches 172 are caused to extend outwardly sideways. Because the outermost surface on the ridges of the strips are thin due to the narrow indentations formed by the arched radial sections 176 they do not tend to flow to any extent in a sideways direction. If the narrow indentations are not formed in the ridges, the outer surface of the ridges will flow sideways when exposed to the beating of the vibrator 154 and increase the dimensions of the projections thereby increasing the strength of the projections by reducing their resilience and flexibility and resulting in a much firmer closure and one which is harder to effect and separate.

In the apparatus and methods described above for making fastener members the resulting corrugated strips have a sinusoidal configuration or, in other words, ridges and depressions extending in opposite directions from the central plane of the fastener members. Adjacent strips of the fastener member are joined together along the plane of the member with the juncture taking place at the points of intersection of the adjacent strips (see FIG. 3, point 24). With certain types of use or abuse the adjacent strips may tear apart at these points of juncture. To preclude such tearing, extra strengh may be conferred upon the adjacent strips by increasing the thickness of the points of juncture.

Figure 27:
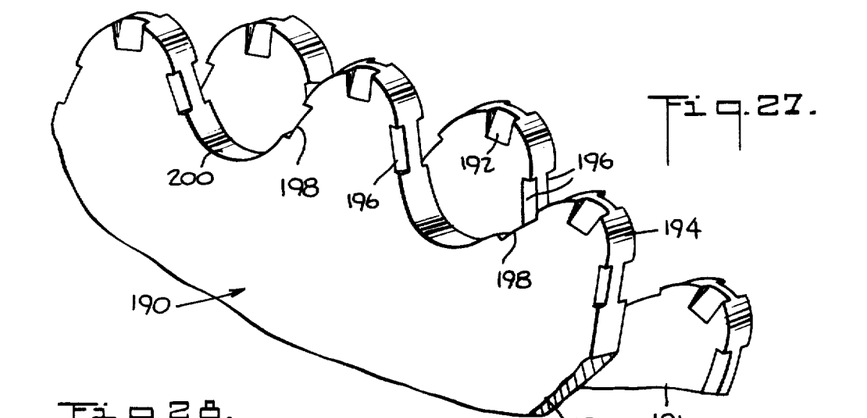
FIG. 27 is a perspective view of a portion of a modified version of the rolling die used in the apparatus of FIG. 18.
Figure 28:
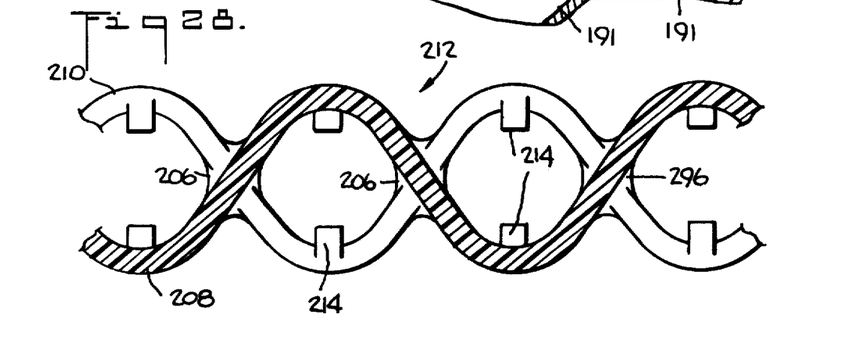
FIG. 28 is a sectional elevational view of a fastener member formed from the rolling die of FIG. 27.

FIG. 27 illustrates one form of apparatus to provide this increased strength. The sheet material 100 from the extruder 102 is passed between pairs of mating rolling dies 190. In this embodiment the rolling dies 190 formed of a series of disks 191 are provided with notches 192 at the apex of the die teeth 194 in order to form projections. Additional notches 196, 198 are formed at the middle of the height between the apex of the teeth 194 and the depression 200 between the teeth. It is at this midpoint that the resultant adjacent corrugated strips cross one another and are joined together. By virtue of the notches 196, 198 additional material will be extruded at the cross-over point of adjacent strips. As can be seen in FIG. 27 the notches 196, 198 on contiguous surfaces of adjacent disks 191 are provided at the same radial distance from the axis of the rolling die 190 so that as the sheet is passed between a pair of mating rolling dies 190 the sheet material fills the notches 196, 198 of the adjacent disks 191 forming a web-like structure 206 joining the adjacent strips 208, 210 of the resulting fastener member 212 (see FIG. 28). The material that flows into the notches 192 forms projections 214 extending from both sides of the corrugated strips 208, 210.

Figure 29:
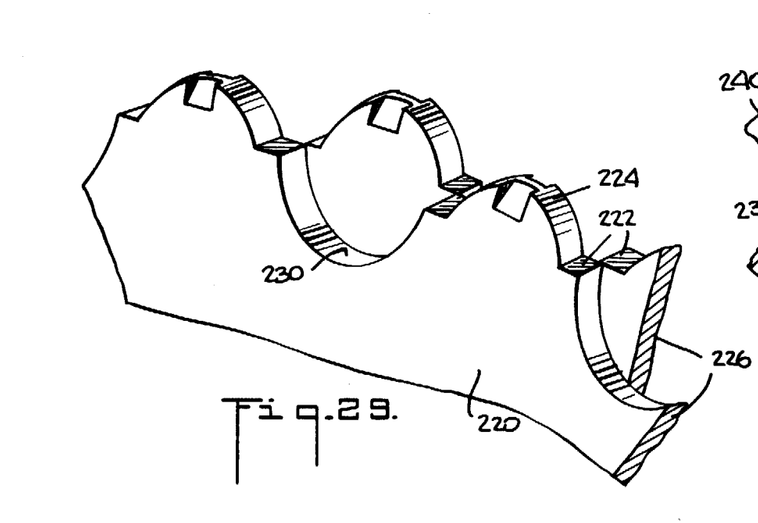
FIG. 29 is a perspective view of a modified portion of a rolling die used in the apparatus of FIG. 18.
Figure 30:
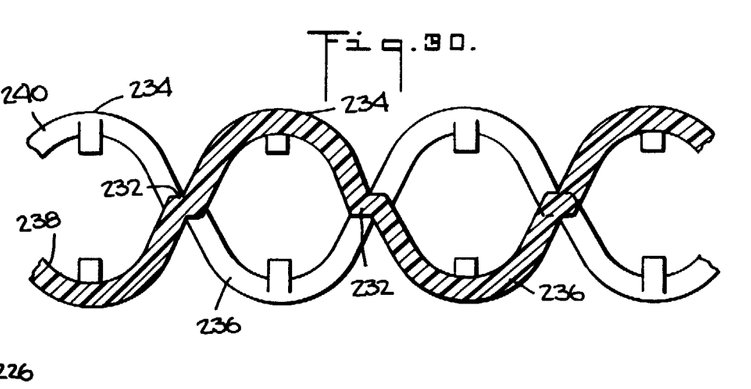
FIG. 30 is a sectional elevational view of a fastener member formed from the rolling die of FIG. 29.

FIG. 29 illustrates a rolling die 220 which also enhances the juncture strength of adjacent strips of fastener members. In place of the notches 196, 198 used in the rolling die 190 (FIG. 27) the rolling die 220 is formed with stepped portions 222 formed at the midpoint between the apex of the teeth 224 of adjacent disks 226 and the depressions 230 between the teeth. As the sheet material is passed between a mating pair of rolling dies 220, steps 232 are formed midway between the ridges 234 and depressions 236 of the resulting corrugated strips 238, 240 (FIG. 30). Since the adjacent corrugated strips 238, 240 are joined at the position of the formation of the steps 232, the resulting juncture is provided with increased strength against being separated or torn apart.

Figure 31:
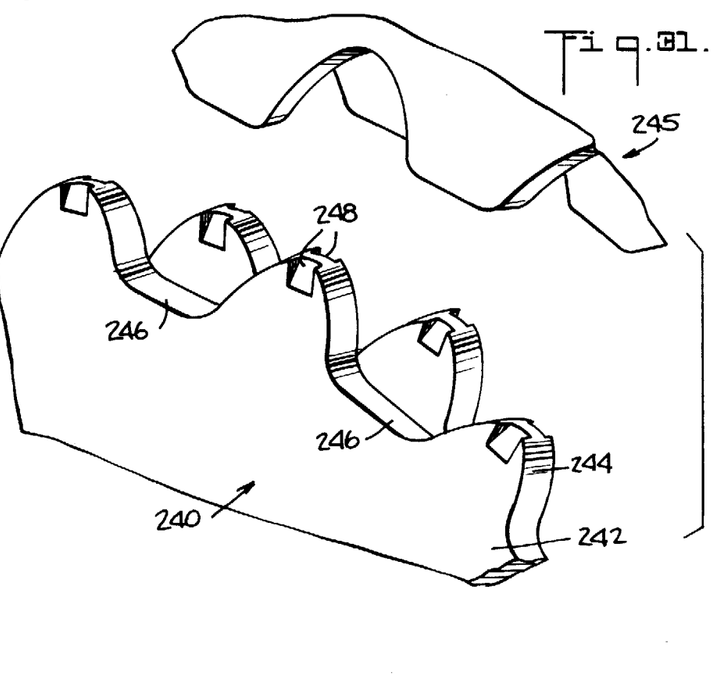
FIG. 31 is a perspective view of a portion of a rolling die used in the apparatus of FIG. 18 for forming the fastener member of FIGS. 9 and 10.
Figure 32:
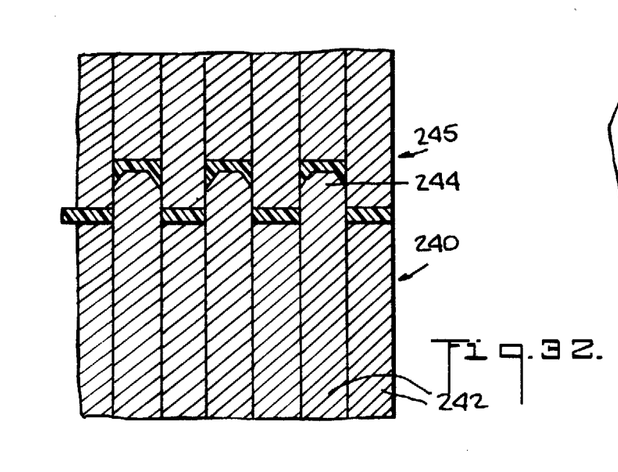
FIG. 32 is a sectional elevational view taken through two mating dies of the type illustrated in FIG. 31 and shown forming a fastener member.

The rolling dies illustrated and discussed above are designed to produce separable fasteners having a sinusoidal curve of the type illustrated in FIGS. 1 through 3. FIG. 31 illustrates a rolling die 240 designated to produce a fastener member having a one-sided form of the type illustrated in FIGS. 10 through 12. As can be seen the rolling die 240 comprises a plurality of adjacent disks 242 each having a periphery of spaced apart teeth 244 disposed alternately with flat intervals 246. A mating rolling die 245 has periphery which conforms to the periphery of die 240. The sheet material is passed between the pair of mating rolling dies 240, 245. The teeth 244 form the ridges 70 of the corrugated strips while the flat intervals 246 form the flat spacing 72 between the ridges of the corrugated strips (compare FIGS. 32 and 10). If projections are desired on the corrugated strips, notches 248 are provided in the teeth 244.

Figure 33:
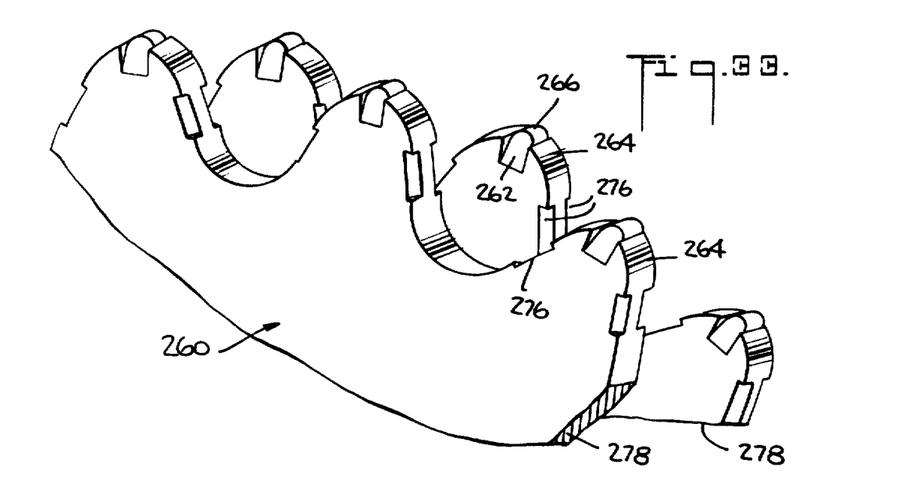
FIG. 33 is a perspective view of a portion of a modified rolling die used in the apparatus of FIG. 18.

A still further modification of the apparatus for producing separable fasteners is illustrated in FIGS. 33 and 34. With reference to FIG. 18, the rolling dies 104, 105 each have the shape of the rolling die 260 shown in FIG. 33. The rolling die 260 actually is a combination of the rolling dies shown in FIGS. 25 and 27 in that it includes notches 262 at the apex of the die teeth 264 and the sections 266 of the teeth between the notches 262 are arched radially outwardly. The notches 262 produce projections 268 on the fastener strips 270 of the resulting fastener member 272 (FIG. 35) while the arched sections 266 form narrow indentations 274 on the inner side of the ridges of the fastener strips.

The rolling die 260 is also provided with notches 276 at the cross-over point of adjacent disks 278, a plurality of which comprise the rolling die 260. The notches 276 form a web like structure joining the contiguous strips 270 of the fastener member 272 in order to form a firm attachment between the contiguous strips 270.

The second set of rolling dies 106, 107 (FIG. 18) are shaped as the die 280 shown in FIG. 34 in order to finish the formation of the corrugated strips 270 and provide a smooth, rounded and continuous surface. It has been found that the smoother the surface of the resultant fastener members, the closer will mating strips adhere together.

What is claimed is:

1. A press-on separable fastener comprising:
   first and second facing fastener portions,
   each of said portions having a plurality of adjoining, longitudinal, undulating strips, each of said strips providing a series of spaced apart ridges,
   within each of said portions, adjoining ones of said strips being longitudinally staggered relative to each other, the thickness of said strips being substantially less than the height of said ridges to provide openings under said ridges,
   within each of said portions, a first one of said strips being laterally spaced from a third one of said strips by a second one of said strips, the lateral distance between the ridges of said first one of said strips and said third one of said strips being determined by the lateral width of said second one of said strips,
   a plurality of projections, each of said projections extending laterally from said ridges of at least said first portion,
   projections on the ridges in said first portion underlying the ridges on said second portion when said portions are engaged,
   each of said portions being an integral element having substantial resilience.

2. The fastener of claim 1 wherein:
   the edges of said strips of said first portion interfere with and frictionally engage the edges of said strips of said second portion when said portions are engaged.

3. The fastener of claim 1 wherein:
   each of said strips further provides a series of grooves, said grooves and said ridges of each of said strips alternating along the longitudinal direction of the strip,
   adjoining strips being staggered such that the lateral line across one of ridges in a strip is aligned with a groove in adjoining strips.

4. The fastener of claim 2 wherein:

each of said strips further provides a series of grooves, said grooves and said ridges of each of said strips alternating along the longitudinal direction of the strip, adjoining strips being staggered such that the lateral line across one of said ridges in a strip is aligned with a groove in adjoining strips.

5. The fastener of claim 3 wherein:

within each of said portions, adjoining ones of said strips are joined only at the cross-over points of the undulating strips, said strips being longitudinally positioned so that a lateral line through any one of said cross-over points will pass through cross-over points of each adjacent strip, each of said cross-over points lying along one of said lateral lines, the fastener when flexed longitudinally, bending along said lateral lines through said cross-over points, thereby minimizing deformation of said ridges and grooves.

6. The fastener of claim 4 wherein:

within each of said portions, adjoining ones of said strips are joined only at the cross-over points of the undulating strips, said strips being longitudinally positioned so that a lateral line through any one of said cross-over points will pass through cross-over points of each adjacent strip, each of said cross-over points lying along one of said lateral lines, the fastener when flexed longitudinally, bending along said lateral lines through said cross-over points, thereby minimizing deformation of said ridges and grooves.

7. The fastener of claim 1 wherein said strips are of substanatially equal width.

8. The fastener of claim 2 wherein said strips are of substantially equal width.

9. The fastener of claim 3 wherein said strips are of substantially equal width.

10. The fastener of claim 5 wherein said strips are of substantially equal width.

11. The fastener of claim 6 wherein said strips are of substantially equal width.

* * * * *

UNITED STATES PATENT AND TRADEMARK OFFICE
CERTIFICATE OF CORRECTION

PATENT NO. : 3,955,246
DATED : May 11, 1976
INVENTOR(S) : Akio Tanaka

It is certified that error appears in the above–identified patent and that said Letters Patent are hereby corrected as shown below:

Col. 1, line 32, after "pressed" insert --together--.

Col. 4, line 26, correct the spelling of "can"

Col. 7, line 6, change "synthetic" to --symmetric--.

Signed and Sealed this

Third Day of August 1976

[SEAL]

Attest:

RUTH C. MASON
*Attesting Officer*

C. MARSHALL DANN
*Commissioner of Patents and Trademarks*